United States Patent

Shiomi et al.

[11] Patent Number: 4,908,417
[45] Date of Patent: Mar. 13, 1990

[54] THERMOSETTING RESIN COMPOSITION

[75] Inventors: Yutaka Shiomi, Hirakata; Kunimasa Kamio, Suita; Satoru Haraguchi, Toyonaka; Shigeki Naitoh, Hirakata, all of Japan

[73] Assignee: Sumitomo Chemical Company, Limited, Osaka, Japan

[21] Appl. No.: 347,157

[22] Filed: May 2, 1989

[30] Foreign Application Priority Data

May 17, 1988 [JP] Japan .................................. 63-121372

[51] Int. Cl.$^4$ ........................................... C08F 283/04
[52] U.S. Cl. ................................... 525/422; 525/479; 525/502
[58] Field of Search ........................ 525/422, 479, 502

[56] References Cited

U.S. PATENT DOCUMENTS 4,632,966 12/1986 Kanagawa et al. .................. 525/502
4,755,569 7/1988 Kanagawa et al. .................. 525/502

Primary Examiner—Melvyn I. Marquis
Assistant Examiner—Karen A. Hellender
Attorney, Agent, or Firm—Stevens, Davis, Miller & Mosher

[57] ABSTRACT

A thermosetting resin composition is prepared by mixing
(A) a phenol novolak resin having hydroxy groups and allyl-etherified hydroxy groups,
(B) a polymaleimide compound having two or more maleimide groups in the molecule, and
(C) at least one silicone resin having the following formula (I);

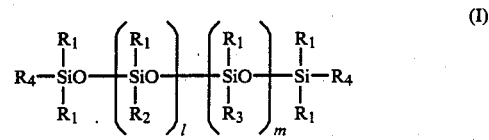

wherein $R_1$ and $R_2$, which may be the same or different, are methyl or phenyl; $R_3$ and $R_4$, which may be the same or different, are methyl, phenyl, hydrogen or a group having an amino group or an epoxy group but at least one of $R_3$ and $R_4$ is hydrogen or a group having an amino group or an epoxy group; and $l$ and $m$, which may be the same or different, are a number of 0-400. The thermosetting resin composition of the present invention can be suitably used for encapsulating electric devices, for example, and gives, by curing, a cured resin product of high quality.

18 Claims, No Drawings

THERMOSETTING RESIN COMPOSITION

The present invention relates to a resin composition useful for molding applications. More particularly, it relates to a resin composition useful, for example, for encapsulating electric devices, such as semiconductors. The composition has a superior processability and gives a cured product having humidity resistance, thermal resistance, low inner stress and electric insulation.

Epoxy resins have been so far widely used for encapsulating electric devices, such as semiconductors. The encapsulation with epoxy resins is currently widely used, because it is more economically advantageous than the hermetic seal method. In recent years, however, the encapsulants have come to be required to possess a higher quality than before, particularly in thermal resistance and humidity resistance, because the conditions of using electric devices have become severer.

In order to meet the requirement, various types of resin compositions giving a cured product which has a superior thermal resistance and humidity resistance have been proposed. However, electric devices have a tendency to become larger and to rise in integration level today. So, using conventional epoxy resin compositions for encapsulating semiconductors causes such problems that the passivation layer or the resin encapsulating the electric device readily cracks, or a bonding wire is readily cut due to the thermal stress caused by the difference in coefficient of linear expansion between the resin for encapsulation and the tip or leadframe. Therefore, resin compositions giving a cured product which has an excellent low inner stress as well as an excellent thermal resistance and humidity resistance have long been desired.

Under these circumstances, the present inventors have undertaken extensive studies for developing resin compositions of high processability giving a cured product which has an excellent thermal resistance, humidity resistance, electric insulation and low inner stress, and as a result, found that the object can be accomplished by resin compositions comprising a specified novolak resin, a specified polymaleimide compound and at least one specified silicone resin.

Based on the above-mentioned findings, the present invention was accomplished.

According to the present invention, there is provided a thermosetting resin composition which comprises (A) a phenol novolak resin having hydroxy groups and allyl-etherified hydroxy groups, (B) a polymaleimide compound having two or more maleimide groups in the molecule, and (c) at least one silicone resin having the following formula (I):

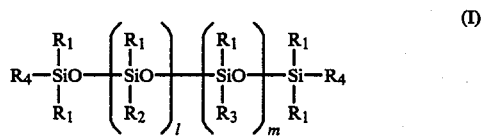

wherein $R_1$ and $R_2$, which may be the same or different, are methyl or phenyl; R and R , which may be the same or different, are methyl, phenyl, hydrogen or a group having an amino group or an epoxy group but at least one of $R_3$ and $R_4$ is hydrogen or a group having an amino group or an epoxy group; and l and m are a number of 0–400, respectively.

The phenol novolak resin having hydroxy groups and allyl-etherified hydroxy groups, used in the invention (hereinafter referred to as partially allyl-etherified novolak), can be prepared by allyl-etherifying a part of phenolic hydroxy groups of a conventional phenol novolak resin usually having a mean nuclei number of 2 to 15.

The conventional phenol novolak resin used for preparing the partially allyl-etherified novolak can be prepared by a conventional condensation reaction of at least one phenol selected from the group consisting of unsubstituted phenol and substituted phenol having one or more alkyl, alkenyl, aryl, aralkyl groups or a halogen atom as substituent (specific examples of said substituted phenol are cresol, ethylphenol, isopropylphenol, butylphenol, octylphenol, nonylphenol, vinylphenol, isopropenylphenol, phenylphenol, benzylphenol, chlorophenol, bromophenol, xylenol, methylbutylphenol and their isomers), with an aldehyde compound such as formaldehyde, furfural acrolein, glyoxal and the like.

The allyl-etherification can be carried out by reacting a novolak resin with an allyl halide such as allyl chloride, allyl bromide, allyl iodide and the like, in the presence of an alkali. In the reaction, the allyl halide is used in a molar amount less than the molar amount of the phenolic hydroxy groups in the phenol resin, and the alkali is used in a molar amount equal to or more than the molar amount of the allyl halide.

Particularly, the allyl-etherified novolak resin can be easily obtained by carrying out the allyl-etherification reaction using allyl bromide or in a aprotic polar solvent such as dimethylformamide, dimethyl sulfoxide, N-methyl-pyrrolidone, acetonitrile, dimethyl acetamide, hexamethylphosphortriamide.

The desired partially allyl-etherified novolak resin can be obtained more easily by using a phenol novolak resin prepared from a substituted phenol. Accordingly, substituted phenols are preferred as the phenol compound usable in the present invention. Particularly, phenol novolak resins prepared from o-cresol are more preferable, because the resin compositions prepared from such resins give a cured product having a particularly improved humidity resistance.

The molar ratio of the allyl-etherified hydroxy groups to the unsubstituted hydroxy groups is preferably 0.2:1 to 9:1, and more preferably 0.3:1 to 6:1. If the proportion of the allyl-etherified hydroxy groups is higher than 9:1 or lower than 0.2:1, the curability and thermal resistance of the product are tend to be deteriorated.

The polymaleimide compound having two or more maleimide groups in the molecule, used in the invention, has two or more maleimide groups of the formula (III) in the molecule:

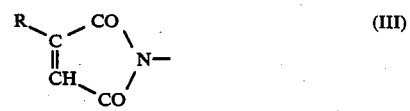

wherein R is hydrogen or a lower alkyl group having 1 to 5 carbon atoms.

Specific examples of the polymaleimide compounds are N,N'-bismaleimide compounds such as N,N'-diphenylmethane-bismaleimide, N,N'-phenylenebismaleimide, N,N'-diphenyl ether bismaleimide, N,N'-diphenyl sulfone bismaleimide, N,N'-dicyclohexylmethane-bismaleimide, N,N'-xylene-bismaleimide, N,N'-tolylene-bismaleimide, N,N'-xylylene-bismaleimide, N,N'-diphenylcyclohexanebismaleimide, N,N'-dichlorodiphenylmethane-bismaleimide, N,N'-diphenylmethane-bismethylmaleimide, N,N'-diphenyl ether bismethylmaleimide, N,N'-diphenyl sulfone bismethylmaleimide (including isomers), N,N'-ethylenebismaleimide, N,N'-hexamethylenebismaleimide and N,N'-hexamethylenebismethylmaleimide; prepolymers having N,N'-bismaleimide skeletons at their molecular ends which can be obtained by adding a diamine compound to the above-mentioned N,N'-bismaleimide compounds; and maleimide and methyl maleimide derivatives of aniline-formaldehyde polycondensate. Among them, N,N'-diphenylmethane-bismaleimide and N,N'-diphenyl ether bismaleimide are particularly preferable.

The silicone resins usable in the present invention are those having the following formula (I).

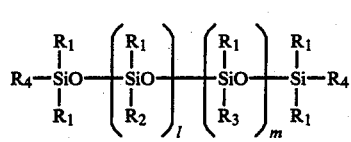
(I)

wherein $R_1$ and $R_2$, which methyl or phenyl; $R_3$ and $R_4$, which may be the same or different, are methyl, phenyl, hydrogen or a group having an amino group or an epoxy group but at least one of $R_3$ and $R_4$ is hydrogen or a group having an amino group or an epoxy group; and l and m are a number of 0–400, respectively.

Among the silicone resins represented by the formula (I), the resin having the formula wherein m=0, $R_4$ is hydrogen or a group having an amino group or an epoxy group is more preferable than the others because the others are apt to cause gelation.

Two or more of the above-mentioned silicone resins can be used together. It is particularly preferable to use a resin containing hydrogen as $R_3$ or $R_4$ together with a resin containing a group having an amino group as $R_3$ or $R_4$, because using these resins particularly improves the mechanical properties and inner stress of the product.

Specific examples of the silicone resin containing hydrogen as $R_3$ or $R_4$ (hereinafter referred to as hydrogen-containing silicone resin) are X-21-7628 (a trade mark for a silicone resin manufactured by Shinetsu Silicone Co. having the formula,

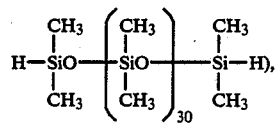

and the like.

Specific examples of the silicone resin containing a group having an amino group as $R_3$ or $R_4$ (hereinafter referred to as amino-containing silicone resin) are X-22-161A (manufactured by Shinetsu Silicone Co. having the formula,

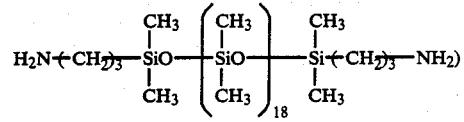

and SF-8417 (manufactured by Toray Silicone Co. having the formula,

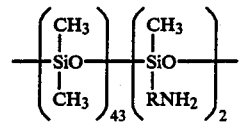

wherein R is a lower alkylene group), etc.

Specific examples of the silicone resin containing an epoxy group as $R_3$ or $R_4$ (hereinafter referred to as epoxy-containing silicone resin) are BX16-855B (manufactured by Toray Silicone Co. having the

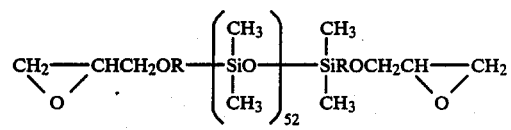

wherein R is a lower alkylene group), etc.

Although the number average molecular weight of the silicone resin is not critical, it is preferably about 500 to about 30,000, more preferably about 500 to 5,000.

The silicone resin may be simply mixed with the partially allyl-etherified phenol novolak and the polymaleimide compound to prepare the resin composition of the present invention. However, when the hydrogen-containing silicone resin or the epoxy-containing silicone resin is used, it is preferable to react the silicone resin with the partially allyl-etherified novolak resin prior to the mixing of the other constituents of the resin composition. And when the amino-containing silicone resin is used, it is preferable to react the silicone resin with the polymaleimide compound prior to the mixing of the other constituents of preparation of the resin composition. Particularly it is preferable that the hydrogen-containing silicone resin reacted in advance with the allyl-etherified novolak resin is used together with amino-containing silicone resin reacted in advance with the polymaleimide compound. In other words, it is particularly preferable that the resin composition comprises the reaction product of the hydrogen-containing silicone resin with the allyl-etherified novolak resin and a reaction product of the amino-containing silicone resin with the polymaleimide compound.

The reaction between the hydrogen-containing silicone resin and the allyl groups of the allyl-etherified novolak resin, a hydro silylation, can be easily carried out in a conventional manner using a platinum catalyst.

The epoxy-containing silicone resin can be easily reacted with the hydroxy groups of the allyl-etherified novolak resin using a basic catalyst such as imidazole.

And the amino-containing silicone resin can be easily reacted with the maleimide groups of the polymaleimide compound.

Carrying out the above-mentioned reactions prevents the bleeding of the silicone resin from the cured product obtained from the resin composition and morphologically uniformly disperses the silicone resin in the cured product.

The quantitative ratios between the ingredients in the resin composition of the present invention may be appropriately determined in accordance with the use and intended thermal resistance of the cured product. Generally saying, the ratio of the number of maleimide groups in the polymaleimide compound to the number of allyl group in the partially allyl-etherified novolak resin in the thermosetting resin composition is preferably 0.4:1 to 3:1, particularly preferably 0.5:1 to 2:1. If the ratio is larger of smaller than the range defined above, the curability and thermal resistance of the cured product tends to be deteriorated. The ratio can be calculated from the data of the $^1$H-NMR spectroscopy on the protons of allyl group ($-CH_2CH=CH_2$) and methyl group attached to benzene ring

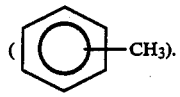

And the proportion of the silicone resin is preferably controlled so that the amount of the silicone resin is from 3 to 30% by weight per the total weight of partially allyl-etherified novolak resin, polymaleimide compound and silicone resin in the composition. If the amount of the silicone resin is smaller than the lower limit mentioned above, the inner stress of the cured product increases, and if the amount is larger than the upper limit, the curability and thermal resistance of the cured product tends to be deteriorated.

In preparing the resin composition of the present invention, the reaction product of the partially allyl-etherified phenol novolak resin with the silicone resin or the reaction product of the polymaleimide compound with the silicone resin may be reacted with other ingredients to give a prepolymer. Carrying out any of these reactions improves the moldability of the composition and gives morphologically uniform cured product. Thus, the advantages of the present invention can be advanced.

The resin composition of the present invention can easily be cured without a catalyst. However, it can be cured more easily, if a catalyst for accelerating the curing is used. The types of the catalyst is not critical. Specific examples of the catalyst include organic phosphine compounds such as triphenylphosphine, tri-4-methylphenylphosphine, tri-4-methoxyphenylphosphine, tributylphosphine, trioctylphosphine, tri-2-cyanoethylphosphine; free-radical polymerization initiators such as benzoylperoxide, di-tert-butylperoxide, dicumylperoxide, lauroylperoxide, acetylperoxide, methylethylketoneperoxide, cyclohexanoneperoxide, t-butylhydroperoxide, azobisisobutylnitrile; amine; tetraammonium salts such as tertiary amines such as trimethylamine, triamylamine; quaternary ammonium salt such as benzyl-triethylammonium chloride, benzyltriethylammonium hydroxide; imidazole compounds, boron trifluoridamine complex, transition metal acetylacetonate, and the like.

Among the catalysts mentioned above, an organic phosphine compound or imidazole compound is particularly preferable.

Known polymerization inhibitors may be used to regulate the curing rate. Examples of the polymerization inhibitors include phenol compounds such as 2,6-di-tert-butyl-4-methylphenol, 2,2-methylenebis(4-ethyl-6-tert-butylphenol), 4,4′-methylenebis(2,6-di-tertbutylphenol), 4,4′-thiobis(3-methyl-6-tert-butylphenol), hydroquinonemonomethylether; polyhydric phenol such as hydroquinone, catechol, p-tert-butylcatechol, 2,5-di-tert-butylhydroquinone, methylhydroquinone, pyrogallol; phenothiazine compounds such as phenothiazine, benzophenothiazine, acetamidephenothiazine; N-nitrosoamine compounds such as N-nitrosodiphenylamine, N-nitrosodimethylamine, and the like.

The resin composition of the present invention may contain a known epoxy resin and a known curing agent for epoxy resin. Examples of the epoxy resin include one or more members selected from novolak type epoxy resins derived from novolak resins which are prepared by the reaction of formaldehyde and a phenol such as phenol, o-cresol, and the like; glycidyl ether compounds derived from dihydric, trihydric or higher-hydric phenols such as Bisphenol A, Bisphenol F, hydroquinone, resorcine, phloroglucin, tris(4-hydroxyphenyl)-methane, 1,1,2,2-tetrakis-(4-hydroxyphenyl)-ethane and the like or halogenated bisphenols such as tetrabromo-Bisphenol A and the like; amine type epoxy resins derived from aniline, p-aminophenol, m-aminophenol, 4-aminometacresol, 6-aminometacresol, 4,4′-diaminodiphenylmethane, 3,3′-diaminodiphenylmethane, 4,4′-diaminodiphenyl ether, 3,4′-diaminodiphenyl ether, 1,4-bis(4-aminophenoxy)-benzene, 1,4-bis(3-aminophenoxy)-benzene, 1,3-bis(4-aminophenoxy)-benzene, 1,3-bis(3-aminophenoxy)-benzene, 2,2-bis(4-aminophenoxyphenyl)-propane, p-phenylenediamine, m-phenylenediamine, 2,4-toluenediamine, 2,6-toluenediamine, p-xylylenediamine, m-xylylenediamine, 1,4-cyclohexanebis(methylamine), 1,3-cyclohexanebis(methylamine), 5-amino-1-(4′-aminophenyl)-1,3,3-trimethylindane, 6-amino-1-(4′-aminophenyl)-1,3,3-trimethylindane and the like; glycidyl ester compounds derived from aromatic carboxylic acids such as p-oxybenzoic acid, m-oxybenzoic acid, terephthalic acid, isophthalic acid and the like; hydantoin type epoxy resins derived from 5,5-dimethylhydantoin and the like; alicyclic epoxy resins such as 2,2′-bis(3,4-epoxycyclohexyl)-propane, 2,2-bis-(4-(2,3-epoxypropyl)cyclohexyl)-propane, vinylcyclohexene dioxide, 3,4-epoxycyclohexylmethyl-3,4-epoxycyclohexanecarboxylate and the like; N,N-diglycidylaniline and the like.

The curing agents for epoxy resins include novolak resins such as phenolnovolak, cresol novolak and the like; aromatic polyamines such as diaminodiphenyl methane, diaminodiphenylsulfone; acid anhydrides such as pyromellit acid anhydride, benzophenonetetracarboxylic acid anhydrides, and the like.

The resin composition of the present invention may further contain an inorganic filler.

The filler is usually indispensable when the resin composition is used for encapsulating semiconductor. Examples of the inorganic fillers are silica powder, alumina, talc, calcium carbonate, titanium white, clay, asbestos, mica, iron oxide red, glass fiber, and the like. Among the examples, silica powder or alumina is particularly preferable. For using the composition for encapsulating semiconductors, the amount of the inorganic fillers may be 25 to 90% by weight, preferably 60 to 80% by weight per the total weight of the resin composition.

The resin composition of the present invention may further contain a natural wax; a synthetic wax; a higher fatty acid; a metal salt thereof; mold releasing agent such as paraffin and the like; a coloring agent such as carbon black; a coupling agent; a flame retarder such as antimony trioxide, phosphorus compounds, brominated epoxy resin and the like. Brominated epoxy resin is particularly preferable to prepare a cured product of high flame retardancy.

The resin composition of the present invention is used for encapsulating electric devices such as semiconductors. And it shows a superior processability, and gives a cured product having an excellent thermal resistance, humidity resistance, and in particular, lower inner stress than before. In summary, it is an excellent resin composition for an encapsulant.

The following examples serve to give specific illustrations of the practice of the present invention, but they are not intended in any way to limit the scope of the present invention.

Silicone resins used in the following Reference Examples, Examples and Comparative Examples are shown below.

Silicone resin (a)

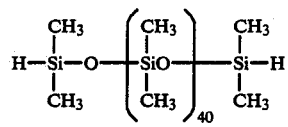

Silicone resin (b)

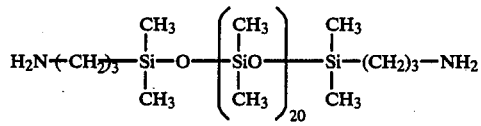

Silicone resin (c)

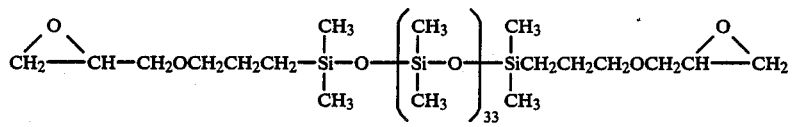

REFERENCE EXAMPLE 1

Into a reactor equipped with a thermometer, a stirrer, a dropping funnel and a reflux condenser were charged 236 parts (2 equivalents) of o-cresol novolak resin having a softening point of 90° C. and 840 parts of dimethylsulfoxide as a reaction solvent. After the resin had been completely dissolved, 41 parts (1.0 equivalent) of 97% sodium hydroxide was added thereto and thoroughly stirred. Then 80 parts (1.05 equivalents) of allyl chloride was added by drops over a period of one hour while keeping the temperature of the system at 40° C. Then, the reaction system was heated to 50° C. and kept at this temperature for 5 hours. After dimethylsulfoxide had been distilled off, 300 parts of methylisobutylketone was added to dissolve the resulting resin. The resulting solution was washed with water and filtered to remove the inorganic salt contained therein. Concentrating the filtrate gave 262 parts of a red-orange colored semisolid resin having a degree of allyl-etherification of 50%, and an OH equivalent of 276 g/eg. Hereinafter, this resin is referred to as ALN.

REFERENCE EXAMPLE 2

[Silicone Modification]

Into a reactor were charged 100 parts of ALN obtained in Reference Example 1, 2 parts of platinum black catalyst (containing 1% by weight of platinum relative to the total weight of the catalyst) and 331 parts of xylene as a reaction solvent. Then, the reaction system (the mixture) was heated and water in the system was completely, azeotropically distilled off from the reaction system. Thereafter 42 parts of silicone resin (a) was added thereto by drops over a period of about 1 hour at the distillation temperature, and the reaction system was kept at the reflux temperature of xylene for about 5 hours. Then, the reaction system was filtered to completely remove the platinum black and the filtrate was concentrated to obtain a silicone-modified resin (hereinafter referred to as modified resin (a)).

REFERENCE EXAMPLE 3

[Silicone Modification]

Into a reactor were charged 100 parts of N,N'-diphenylmethanebismaleimide (hereinafter referred to as BMI) and 369 parts of 1,4-dioxane as a reaction solvent. And the reaction system was heated up to 100° C. and BMI was dissolved completely. Then, 58 parts of silicone resin (b) was added thereto by drops over a period of about one hour and the reaction system was kept at this temperature for one hour. Removing dioxane from the reaction system by distillation gave a silicone modified resin (hereinafter referred to as modified resin (b)).

REFERENCE EXAMPLE 4

[Silicone Modification]

Into a reactor were charged 100 parts of ALN obtained in Reference Example 1, 0.08 part of 4-methylimidazole and 331 parts of xylene. The reaction system was heated up to 140° C. and the resin was dissolved completely. And 42 parts of silicone resin (c) was added thereto by drops over a period of about one hour and the reaction system was kept at 140° C. for about 2 hours. Then, xylene in the system was removed by distillation to obtain a silicone modified resin (hereinafter referred to as modified resin (c)).

REFERENCE EXAMPLE 5

[Silicone Modification]

Into a reactor were charged 38 parts of ALN obtained in Reference Example 1, 142 parts of modified resin (a), 358 parts of BMI and 770 parts of 1,4-dioxane as a solvent. The reaction system was heated up to 80° C. and the resins were dissolved completely. And then, a solution obtained by dissolving 30 parts of silicone of resin (b) into 30 parts of 1,4-dioxane was added thereto by drops over a period of about one hour and The reaction system was kept at 80° C. for one hour. Then 1,4-dioxane in the system was removed by distillation to obtain a silicone modified resin (hereinafter referred to as modified resin (d)).

REFERENCE EXAMPLE 6

[Silicon Modification]

Into a reactor were charged 196 parts of modified resin (a) obtained in Reference Example 2, 358 parts of BMI and 800 parts of 1,4-dioxane as a solvent. The reaction system was heated up to 80° C. and the resins were dissolved completely. And then, a solution obtained by dissolving 29 parts of silicone resin (b) into 29 parts of 1,4-dioxane was added thereto by drops over a period of about one hour and the reaction system was kept at 80° C. for one hour. Then 1,4-dioxane in the system was removed by distillation to obtain a silicone modified resin (hereinafter referred to as modified resin (e))

REFERENCE EXAMPLE 7

[Prepolymerization]

Into a 1-liter, four-necked flask were charged 100 parts of modified resin (a) and 183 parts of BMI. And the reaction system was heated up to 130° C. to fuse and mix the system. Then, the mixed reaction system was kept at this temperature for about one hour while stirring to obtain a prepolymer. Hereinafter, the prepolymer is referred to as prepolymer A.

REFERENCE EXAMPLE 8

[Prepolymerization]

Into a 1-liter, four-necked flask were charged 100 parts of ALN obtained in Reference Example 1 and 301 parts of Modified Resin (b) obtained in Reference Example 3. And the reaction system was heated up to 130° C. to fuse and mix the system. Then, the mixed reaction system was kept at this temperature for about one hour while stirring to obtain a prepolymer.

Hereinafter, the prepolymer is referred to as prepolymer B.

REFERENCE EXAMPLE 9

[Prepolymerization]

Into a 1-liter, four-necked flask were charged 100 parts of the modified resin (c) obtained in Reference Example 4 and 183 parts of BMI. And the reaction system was heated up to 130° C. to fuse and mix the system. Then, the mixed reaction system was kept at this temperature for about one hour while stirring to obtain a prepolymer. Hereinafter, the prepolymer is referred to as prepolymer C.

EXAMPLES 1-5

A resin composition for molding was prepared by mixing modified resin (e) or (d), prepolymer A, B or C, an o-cresol novolak type epoxy resin (trade name: ESCN-195XL; manufactured by Sumitomo Chemical Company, Limited), curing accelerating catalysts, a filler, a coupling agent and a mold releasing agent as shown in Table 1. The resin composition was fused and kneaded at a temperature shown in Table 1 for five minutes, then cooled, and crushed. Then, the crushed composition was transfer molded at 70 Kg/cm$^2$ and 175° C. for 3 minutes and post-cured at 200° C. for additional 5 hours to obtain each cured resin product The physical properties of each cured resin product were evaluated. Table 2 shows the results

COMPARATIVE EXAMPLE 1

A resin composition for molding was prepared by mixing an o-cresol novolak type epoxy resin (ESCN195XL), phenol novolak resin (OH equivalent 110 g/eq, softening point 90° C.) curing accelerating catalysts, a filler, a coupling agent and a mold releasing agent as shown in Table 1. And the resin composition was fused and kneaded at a temperature shown in Table 1 for five minutes, and cooled and crushed. The crushed composition was transfer molded at 70 Kg/cm$^2$ and 175° C. for 5 minutes and post-cured at 180° C. for additional 5 hours to obtain a cured resin product. The physical properties of each cured product were evaluated. Table 2 shows the results.

TABLE 1

(Numbers in Table 1 represent parts by weight)

| Example No. | Example | | | | | | | | Comparative example |
|---|---|---|---|---|---|---|---|---|---|
| | 1 | 2 | 3 | 4 | 5 | 6 | 7 | 8 | 1 |
| Prepolymer A | 100 | 100 | 100 | — | — | — | — | — | — |
| Prepolymer B | — | — | — | 100 | 100 | — | — | — | — |
| Prepolymer C | — | — | — | — | — | 100 | — | — | — |
| Modified resin (e) | — | — | — | — | — | — | 100 | — | — |
| Modified resin (d) | — | — | — | — | — | — | — | 100 | — |
| ESCN-195XL*[1] | — | — | — | — | — | — | — | — | 100 |
| Phenol novolak resin*[5] | — | — | — | — | — | — | — | — | 56 |
| Triphenyl phosphine | 0.8 | 0.8 | 0.8 | 0.8 | 0.8 | 0.8 | 0.8 | 0.8 | — |
| 4-Methyl imidazole | 0.7 | 0.7 | 0.7 | 0.7 | 0.7 | 0.7 | 0.7 | 0.7 | — |
| 1,8-Diaza(5,4,0)bicyclo-undecen-7 | — | — | — | — | — | — | — | — | 2 |
| Carnava wax | 0.7 | 0.7 | 0.7 | 0.7 | 0.7 | 0.7 | 0.7 | 0.7 | 1 |
| Silane coupling agent 1*[2] | 1.5 | 1.5 | 1.5 | 1.5 | 1.5 | 1.5 | 1.5 | 1.5 | — |
| Silane coupling agent 2*[3] | — | — | — | — | — | — | — | — | 2 |

TABLE 1-continued (Numbers in Table 1 represent parts by weight)

| Example No. | Example 1 | 2 | 3 | 4 | 5 | 6 | 7 | 8 | Comparative example 1 |
|---|---|---|---|---|---|---|---|---|---|
| Fused silica*[4] | 233 | 246 | 333 | 233 | 246 | 233 | 333 | 333 | 364 |

*[1]ESCN-195XL: o-Cresol novolak resin manufactured by Sumitomo Chemical Co., Ltd. having an epoxy equivalent of 195 g/eq.
*[2]Silane coupling agent 1: KBM-573 (manufactured by Shinetsu Silicone Co.)
*[3]Silane coupling agent 2: SH-6040 (manufactured by Toray Silicone Co,)
*[4]Fused silica: FS-891 (manufactured by Denki Kagaku Kogyo Co.)
*[5]Phenol novolak resin: (OH equivalent: 110 g/eq, softening point: 90° C.)

TABLE 2

| Properties | | 1 | 2 | 3 | 4 | 5 | 6 | 7 | 8 | Comparative Example 1 |
|---|---|---|---|---|---|---|---|---|---|---|
| Spiral Flow (inch) 175° C. × 70 Kg/cm² | | 45 | 43 | 30 | 45 | 49 | 39 | 30 | 28 | 43 |
| Barcol hardness (935) | 175° C./90 sec. | 67 | 68 | 75 | 67 | 68 | 64 | 65 | 64 | 80 |
|  | 175° C./180 sec. | 73 | 73 | 78 | 74 | 77 | 71 | 72 | 72 | 84 |
| Grass transition temperature Tg (°C.) | | 267 | 263 | 263 | 260 | 261 | 258 | 258 | 264 | 158 |
| Linear coefficient of expansion*[1] × $10^5$ °C.$^{-1}$ (<Tg) | | 1.1 | 1.1 | 0.9 | 1.4 | 1.5 | 1.2 | 0.9 | 0.8 | 2.4 |
| Bending strength (Kg/mm²) | | 12.5 | 13.8 | 14.5 | 14.0 | 14.2 | 13.6 | 14.6 | 13.5 | 15.6 |
| Bending modulus (Kg/mm²) | | 1180 | 1200 | 1400 | 1190 | 1210 | 1230 | 1200 | 1100 | 1400 |
| Volume resistivity (Ω-cm) | Normal state | $4.5 \times 10^{16}$ | $5.0 \times 10^{16}$ | $4.6 \times 10^{16}$ | $5.5 \times 10^{16}$ | $6.3 \times 10^{16}$ | $5.0 \times 10^{16}$ | $4.8 \times 10^{16}$ | $6.5 \times 10^{16}$ | $8.4 \times 10^{16}$ |
|  | PCT*[2] 100 hr | $1.0 \times 10^{15}$ | $1.5 \times 10^{15}$ | $1.6 \times 10^{15}$ | $1.0 \times 10^{15}$ | $1.6 \times 10^{15}$ | $1.1 \times 10^{15}$ | $1.5 \times 10^{15}$ | $1.7 \times 10^{15}$ | $1.6 \times 10^{15}$ |
|  | PCT*[2] 300 hr | $4.2 \times 10^{14}$ | $7.6 \times 10^{14}$ | $8.2 \times 10^{14}$ | $4.5 \times 10^{14}$ | $8.5 \times 10^{14}$ | $3.5 \times 10^{14}$ | $7.9 \times 10^{14}$ | $8.0 \times 10^{14}$ | $4.3 \times 10^{14}$ |
|  | PCT*[2] 500 hr | $3.3 \times 10^{14}$ | $6.0 \times 10^{14}$ | $7.4 \times 10^{14}$ | $3.3 \times 10^{14}$ | $7.0 \times 10^{14}$ | $2.1 \times 10^{14}$ | $7.2 \times 10^{14}$ | $7.1 \times 10^{14}$ | $4.2 \times 10^{14}$ |
| Water absorption | PCT*[2] 100 hr | 1.01 | 0.98 | 0.93 | 0.99 | 0.95 | 1.05 | 0.92 | 0.93 | 0.86 |
|  | PCT*[2] 300 hr | 1.15 | 1.10 | 1.06 | 1.10 | 1.07 | 1.20 | 1.05 | 1.07 | 1.00 |
|  | PCT*[2] 500 hr | 1.20 | 1.16 | 1.11 | 1.20 | 1.14 | 1.31 | 1.09 | 1.12 | 1.08 |

*[1]Measured by TMA method (with a thermomechanical analyzer manufactured by Shimadzu Corporation)
*[2]PCT: Pressure cooker test (121° C. × 100% RH)

We claim:

1. A thermosetting resin composition which comprises
(A) a phenol novolak resin having hydroxy groups and allyl-etherified hydroxy groups,
(B) a polymaleimide compound having two or more maleimide groups in the molecule, and
(C) at least one silicone resin having the following formula (I);

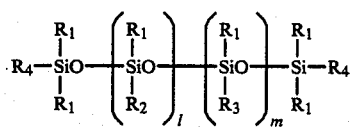
(I)

wherein $R_1$ and $R_2$, which may be the same or different, are methyl or phenyl; $R_3$ and $R_4$, which may be the same or different, are methyl, phenyl, hydrogen or a group having an amino group or an epoxy group but at least one of $R_3$ and $R_4$ is hydrogen or a group having an amino group or an epoxy group; and l and m, which may be the same or different, are a number of 0-400.

2. A composition according to claim 1, wherein the constituent (C) is at least one silicone resin having the formula (I), wherein m is zero and $R_4$ is hydrogen or a group having an amino group or an epoxy group.

3. A composition according to claim 2, wherein $R_1$ is methyl.

4. A composition according to claim 2, wherein $R_1$ and $R_3$ are methyl.

5. A composition according to claim 2, wherein the number average molecular weight of the silicone resin ranges from about 500 to 30,000.

6. A composition according to claim 2, wherein $R_4$ is one member selected from the group consisting of hydrogen, 3-aminopropyl and 3-glycidyloxypropyl.

7. A composition according to claim 1, wherein the constituent (C) contains two silicone resins, one of which containing hydrogen as $R_3$ or $R_4$ and another of which containing a group having an amino group as $R_3$ or $R_4$.

8. A composition according to claim 1, wherein the constituent (C) is a silicone resin containing hydrogen or a group having an epoxy group as $R_3$ or $R_4$.

9. A process for preparing a composition according to claim 8, which comprises reacting the silicone resin (C) with the phenol novolak resin (A) prior to the mixing of the other constituents of the resin composition.

10. A process for preparing a composition according to claim 8, which comprises reacting the silicone resin (C) with the phenol novolak resin (A) and then reacting the reaction product of (C) and (A) with the polymaleimide compound (B).

11. A composition according to claim 1, wherein the constituent (C) is a silicone resin containing a group having an amino group as $R_3$ or $R_4$.

12. A process for preparing a composition according to claim 11, which comprises reacting the silicone resin (C) with the polymaleimide compound (B) prior to the mixing of the other constituents of the resin composition.

13. A process for preparing a composition according to claim 11, which comprises reacting the silicone resin (C) with the polymaleimide compound (B) and then reacting the reaction product of (C) and (B) with the phenol novolak resin (A).

14. A composition according to claim 1, wherein the constituent (C) contains two silicone resins, one of which containing hydrogen or a group having an epoxy group as $R_3$ or $R_4$ and another of which containing a group having an amino group as $R_3$ or $R_4$.

15. A process for preparing a composition according to claim 14, which comprises reacting the silicone resin (C) containing hydrogen or a group having an epoxy group as $R_3$ or $R_4$ with the phenol novolak resin (A); reacting the silicone resin (C) containing a group having an amino group as $R_3$ or $R_4$ with the polymaleimide compound (B); and then reacting both reaction products.

16. A composition according to claim 1, wherein the ratio of the number of maleimide group in the polymaleimide compound (B) to the number of allyl group in the phenol novolak resin (A) in the composition falls in the range of from 0.4:1 to 3:1.

17. A composition according to claim 1, wherein the amount of the constituent (C) is 3 to 30% by weight per the total weight of the phenol novolak resin (A) and polyleimide compound (B)

18. A cured resin obtained by curing a composition according to claim 1.

* * * * *